No. 756,284. PATENTED APR. 5, 1904.
S. O. RICHARDSON, Jr.
PROCESS OF MANUFACTURING GLASSWARE.
APPLICATION FILED FEB. 1, 1904.
NO MODEL.
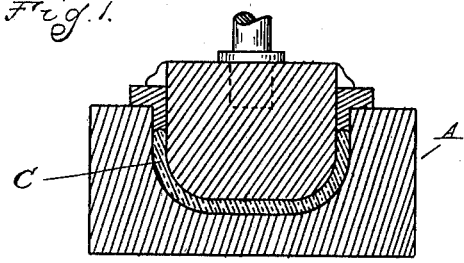
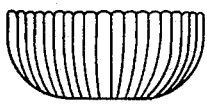
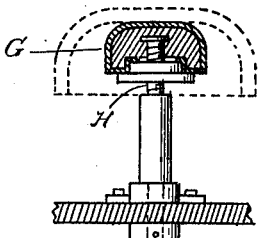
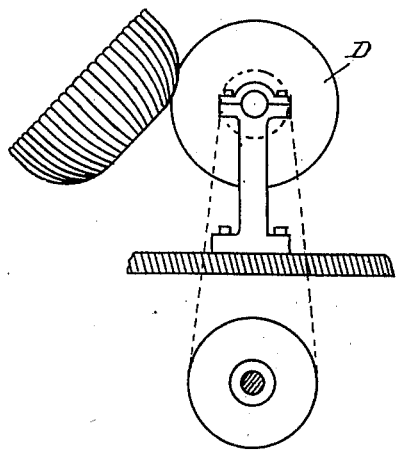
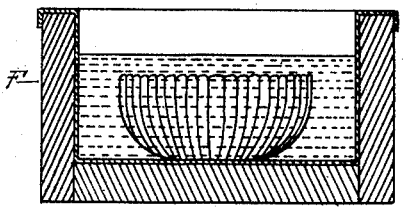
Inventor
Solon O. Richardson, Jr.

No. 756,284. Patented April 5, 1904.

UNITED STATES PATENT OFFICE.

SOLON O. RICHARDSON, JR., OF TOLEDO, OHIO, ASSIGNOR TO THE LIBBEY GLASS COMPANY, OF TOLEDO, OHIO, A CORPORATION OF OHIO.

PROCESS OF MANUFACTURING GLASSWARE.

SPECIFICATION forming part of Letters Patent No. 756,284, dated April 5, 1904.

Application filed February 1, 1904. Serial No. 191,592. (No specimens.)

*To all whom it may concern:*

Be it known that I, SOLON O. RICHARDSON, Jr., a citizen of the United States, residing at Toledo, in the county of Lucas and State of Ohio, have invented certain new and useful Improvements in Processes of Manufacturing Glassware, of which the following is a specification, reference being had therein to the accompanying drawings.

The invention relates to an improved process in the manufacture of glassware; and it consists particularly in shaping the article, as by pressing, together with the design in rough or a partial design applied to the exterior, then in completing the design in the usual way by grinding and finishing the interior of the article by immersing or treating the article in an acid-bath, as more fully hereinafter described.

In the drawings, Figure 1 is a diagram vertical section showing the pressing of the glass in an ordinary glass-press, which may be of any suitable and known construction. Fig. 2 represents a vessel with a partial or rough design imparted thereto by the pressing operation. Fig. 3 is an elevation of the polishing-machine which may be used in polishing the interior of the blank, showing in dotted lines the blank applied thereto. Fig. 4 is a diagram elevation showing the article applied to a cutting-wheel for the purpose of cutting the design to finished form, but unpolished; and Fig. 5 represents a tank, showing the article immersed in the acid-bath.

In carrying out my process plastic glass is delivered to the mold A in any desired manner as is customary in the manufacture of pressed ware. The mold A is provided on its inner surface either with the entire design in the rough or with the principal lines of the design which is to be imparted to the finished article. After the blank is thus made, which is the usual way of making pressed ware, it is annealed in any desired form of leer and is then ready for further treatment.

In pressing the blank in the mold the interior of the article will have an unfinished surface, because, as is well known, in pressing glassware a more or less rough or unpolished surface is given to the glassware by what is called the "mold-marks"—that is, the grain of the metal imparts a slight roughness to the glass, and the extremely fine polish required for cut glassware is not obtained by pressing, but is ordinarily obtained by blowing the blank into its initial shape and afterward cutting it. The blank C, having either the entire design in the rough or the principal lines of the design impressed thereon, is then immersed for two or three seconds in a bath of hydrofluoric acid, as shown in Fig. 5. In this case I have shown the acid applied by dipping in a tank F, containing the acid therein. As soon as the article is treated with the acid it is removed from the tank and thoroughly rinsed with water, preferably with rapid-running water, so that all the acid will be removed and the action of the acid immediately stopped. The object of my treatment with the acid-bath is to cut the hard surface of the interior of the article formed by the plunger coming in contact with it and to more or less remove the mold-marks. After the article is thus treated with the acid-bath and rinsed I preferably polish the interior, using an ordinary felt wheel for that purpose. I have shown in Fig. 3 a felt wheel G on a vertical shaft H, driven by suitable gearing I from the horizontal shaft J, driven from any suitable source of power. The interior face of the article is held against this felt wheel, which is frequently wet by the operator with wet polishing-putty, the wheel revolving rapidly, and the operator holding the blank-wheel and moving it so that the entire inner surface comes in contact with the polishing-wheel, and this brings the inner surface up to the same high polish that it would have if it were a blown blank. The polishing-putty referred to is an ordinary article of commerce and can be obtained from any of the usual glass manufacturers and is in use in many glass-houses at the present time. After the interior of the article has thus been finished the design may be cut upon the outside by the usual cutter D, (shown in Fig. 4,) the cutting being effected on all the shaped faces and the cutting also being done to add any lines desired in addition to those made in the press or die.

This process saves a large amount of the cost of the manufacture, particularly in manufacturing blanks which are afterward to be cut, because the pressing is very much cheaper than the blowing operation and also much more rapid, and when the design is partially pressed into the article to start with the amount of labor required to finish the cutting is greatly reduced.

Instead of using the pure hydrofluoric acid I may use hydrofluoric acid combined with a a small per cent. of sulfuric acid, and it is possible that other acids may be used for the acid-bath if they will have the result of cutting the hard interior surface formed by the press and partially remove the mold-marks.

As many blanks are made in glass-factories which are sold as articles of manufacture to concerns who subsequently do the cutting and as my invention relates largely to the manufacture of the blanks, it is obvious that the novelty of the invention consists in the manufacture of the blank itself rather than in the manufacture of the completed article.

What I claim as my invention is—

1. The herein-described process of making blanks for cut glassware which consists in first shaping the blank, second in subjecting the blank to an acid-bath, to cut the interior surface, third in rinsing the blank, and fourth in polishing the interior of the blank.

2. The herein-described process of manufacturing blanks for cut-glass articles consisting in shaping the blank and simultaneously producing the whole or part of a design on the exterior surface in the rough, then in treating the interior of the blank to an acid-bath to cut the rough surface formed by the plunger then in rinsing the blank to free it from the acid, and then in polishing the interior of the blank.

3. The herein-described process for manufacturing blanks for cut-glass articles, consisting in first pressing the blank to shape and simultaneously producing a whole or part of the design on the exterior in the rough, and then in treating the blank to a bath of hydrofluoric acid, then in polishing the interior of the blank.

4. The herein-described process of manufacturing glassware consisting in shaping the blank with the design in whole or in part applied to the exterior thereof, by pressing the same, next in annealing the blank, next in treating the interior of the blank to a bath of hydrofluoric acid, next in washing the blank to free it from the acid and then polishing the interior of the blank, and then completing the article by cutting the finished design on the exterior.

In testimony whereof I affix my signature in presence of two witnesses.

SOLON O. RICHARDSON, JR.

Witnesses:
JOHN H. WRIGHT,
FRED E. WOLF.